(12) United States Patent
Speth (10) Patent No.: US 8,395,986 B2
(45) Date of Patent: Mar. 12, 2013

(54) TRANSMITTER AND RECEIVER

(75) Inventor: Michael Speth, Krefeld (DE)

(73) Assignee: Intel Mobile Communications GmbH, Neubiberg (DE)

( * ) Notice: Subject to any disclaimer, the term of this patent is extended or adjusted under 35 U.S.C. 154(b) by 779 days.

(21) Appl. No.: 11/961,209

(22) Filed: Dec. 20, 2007

(65) Prior Publication Data

US 2009/0161529 A1 Jun. 25, 2009

(51) Int. Cl.
*H04J 11/00* (2006.01)
(52) U.S. Cl. .......................................................... 370/210
(58) Field of Classification Search .......... 370/208–211, 370/203, 310, 315, 316, 319, 320, 328, 329, 370/335; 375/135, 146; 455/73
See application file for complete search history.

(56) References Cited

U.S. PATENT DOCUMENTS

| | | | | |
|---|---|---|---|---|
| 5,222,103 A * | 6/1993 | Gross | | 375/281 |
| 6,373,827 B1 * | 4/2002 | Tayebi et al. | | 370/310 |
| 6,404,760 B1 * | 6/2002 | Holtzman et al. | | 370/342 |
| 7,050,760 B2 * | 5/2006 | Itoh | | 455/67.13 |
| 7,061,854 B2 * | 6/2006 | Tarokh et al. | | 370/206 |
| 7,280,806 B2 * | 10/2007 | Oshima | | 455/73 |
| 7,280,810 B2 * | 10/2007 | Feher | | 455/137 |
| 7,289,494 B2 * | 10/2007 | Lakkis | | 370/366 |
| 7,295,517 B2 * | 11/2007 | Anim-Appiah et al. | | 370/232 |
| 7,379,417 B2 * | 5/2008 | Agrawalla et al. | | 370/208 |
| 7,532,562 B2 * | 5/2009 | Ridel et al. | | 370/204 |
| 7,539,123 B2 * | 5/2009 | Rhodes | | 370/208 |
| 7,548,579 B1 * | 6/2009 | Murphy et al. | | 375/147 |
| 7,693,033 B2 * | 4/2010 | Nakao et al. | | 370/204 |
| 2001/0030940 A1 * | 10/2001 | Hellberg | | 370/210 |
| 2003/0026201 A1 * | 2/2003 | Arnesen | | 370/210 |
| 2003/0156534 A1 * | 8/2003 | Coulson et al. | | 370/210 |
| 2004/0076172 A1 * | 4/2004 | Sano | | 370/442 |
| 2004/0131033 A1 * | 7/2004 | Dick et al. | | 370/335 |
| 2004/0151140 A1 | 8/2004 | Rozenblit et al. | | |
| 2006/0013327 A1 * | 1/2006 | Sugar et al. | | 375/260 |
| 2007/0133711 A1 * | 6/2007 | Li | | 375/295 |
| 2007/0159959 A1 * | 7/2007 | Song et al. | | 370/208 |
| 2007/0230328 A1 * | 10/2007 | Saitou | | 370/210 |
| 2008/0304404 A1 * | 12/2008 | Lu et al. | | 370/210 |
| 2009/0117858 A1 * | 5/2009 | Furrer et al. | | 455/78 |
| 2009/0196313 A1 * | 8/2009 | Ridel et al. | | 370/536 |
| 2009/0201978 A1 * | 8/2009 | Tonsing et al. | | 375/224 |
| 2010/0091905 A1 * | 4/2010 | Khan | | 375/296 |

* cited by examiner

*Primary Examiner* — Chi Pham
*Assistant Examiner* — Robert Lopata
(74) *Attorney, Agent, or Firm* — Eschweiler & Associates, LLC (57) ABSTRACT

A description is given of a transmitter including a baseband chip, a radio frequency chip and an interface unit coupling the baseband chip and the radio frequency chip. The radio frequency chip includes a modulation unit configured to modulate multiple data streams, wherein each of the data streams is assigned to a subcarrier having a frequency differing from the frequencies of the other subcarriers.

25 Claims, 5 Drawing Sheets

TRANSMITTER AND RECEIVER

FIELD OF THE INVENTION

The invention relates to a transmitter and a receiver as they may, for example, be used in a mobile communications system.

BACKGROUND OF THE INVENTION

Mobile communications systems usually comprise an assembly of baseband components and an assembly of radio frequency components. These assemblies may be coupled by an interface unit.

SUMMARY OF THE INVENTION

According to one embodiment, a transmitter comprises a baseband chip, a radio frequency chip and an interface unit coupling the baseband chip and the radio frequency chip. The radio frequency chip comprises a modulation unit configured to modulate multiple data streams, wherein each of the data streams is assigned to a subcarrier having a frequency differing from the frequencies of the other subcarriers.

According to a further embodiment, a receiver comprises a baseband chip, a radio frequency chip and an interface unit coupling the baseband chip and the radio frequency chip. The radio frequency chip comprises a demodulation unit configured to demodulate multiple data streams, wherein each of the data streams is assigned to a subcarrier having a frequency differing from the frequencies of the other subcarriers.

According to a further embodiment, a transmitter comprises a baseband chip, a radio frequency chip and an interface unit coupling the baseband chip and the radio frequency chip. The radio frequency chip comprises a spreading unit configured to spread a data stream using a spreading code.

According to a further embodiment, a receiver comprises a baseband chip, a radio frequency chip and an interface unit coupling the baseband chip and the radio frequency chip. The radio frequency chip comprises a despreading unit configured to despread a data stream using a despreading code.

BRIEF DESCRIPTION OF THE DRAWINGS

Aspects of the invention are made more evident by way of example in the following detailed description of embodiments when read in conjunction with the attached figures.

DETAILED DESCRIPTION OF THE INVENTION

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. It may be evident, however, to a person skilled in the art that one or more aspects of the embodiments may be practiced with a lesser degree of these specific details. In other instances, structures and devices are shown in block diagram form in order to facilitate describing one or more aspects of the embodiments. The following description is therefore not to be taken in a limiting sense, and the scope of the application is defined by the appended claims.

In addition, while a particular feature or aspect of an embodiment is disclosed with respect to only one of several implementations, such feature or aspect may be combined with one or more other features or aspects of the other implementations as may be desired and feasible for any given or particular application.

Figure 1:
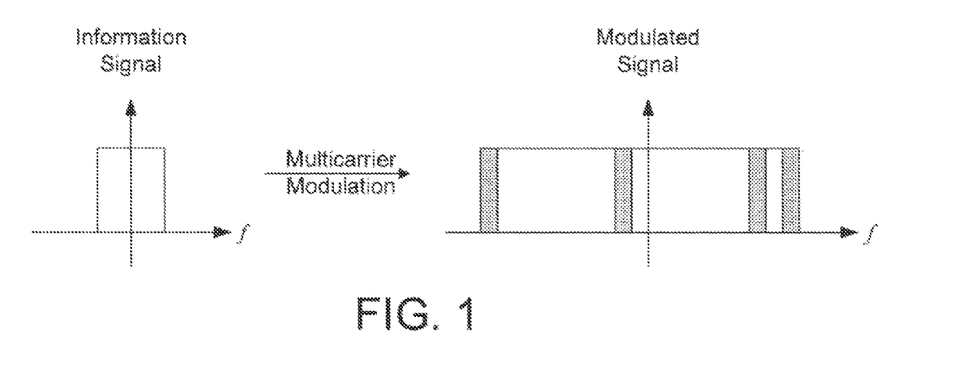
FIG. 1 schematically illustrates the bandwidth of a signal before and after a multi-carrier modulation of the signal.

FIG. 1 schematically illustrates the bandwidth of a signal before and after a multi-carrier modulation of the signal. A first characteristic on the left shows the signal strength of the signal against its frequency, wherein the bandwidth of the signal shall represent the minimal bandwidth required for a proper transmission of the information comprised in the signal. The signal is transmitted by a transmitter of a communications system and for this purpose is applied to a multi-carrier modulation scheme. A second characteristic on the right having the same scale as the first characteristic shows the modulated signal as it is to be sent in the radio frequency range. Here, the individual peaks at various frequencies of the spectrum refer to the frequencies of the subcarriers employed by the multi-carrier modulation scheme. A comparison of the first and the second characteristics shows that the bandwidth of the modulated signal exceeds the bandwidth of the unmodulated signal multiple times, i.e. applying the multi-carrier modulation scheme results in a broadening of the signal bandwidth.

Examples for a multi-carrier modulation scheme resulting in a broadening of the bandwidth are the OFDM (Orthogonal Frequency Division Multiplexing) scheme or the SC-FDMA (Single Carrier Frequency Division Multiple Access) scheme that are used for assigning various discrete and spectrally distributed frequencies to various users. An exemplary embodiment of a transmitter and a receiver employing a multi-carrier modulation scheme are given in FIG. 3 and FIG. 4.

Figure 2:
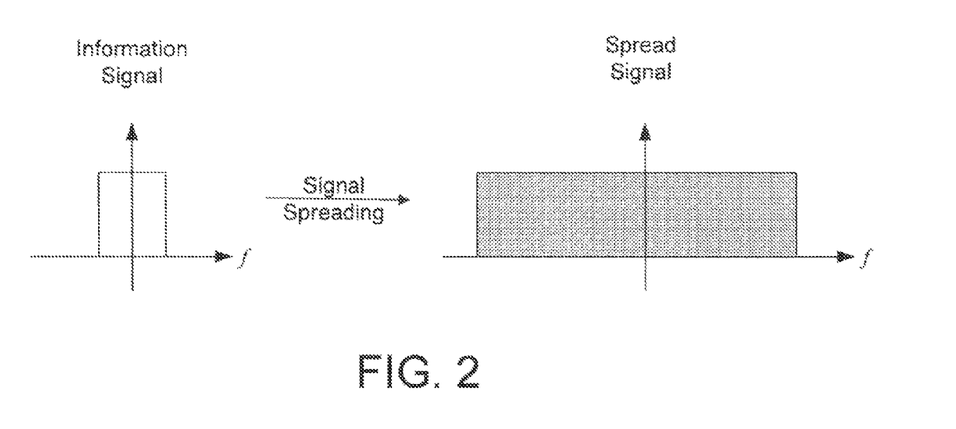
FIG. 2 schematically illustrates the bandwidth of a signal before and after a spreading of the signal.

FIG. 2 schematically illustrates the bandwidth of a signal before and after a spreading of the signal. A first characteristic on the left corresponds to the first characteristic of FIG. 1. In contrast to FIG. 1, the signal is now applied to a spreading scheme, wherein the signal of the first characteristic is spread by a spreading code. A second characteristic on the right having the same scale as the first characteristic shows the spread signal as it is to be sent in the radio frequency range. Similar to FIG. 1, a comparison of the first and the second characteristics shows that the bandwidth of the spread signal exceeds the bandwidth of the unspread signal multiple times, i.e. applying the spreading scheme results in a broadening of the signal bandwidth.

An example for a spreading scheme resulting in a broadening of the bandwidth is the DSSS (Direct Sequence Spread Spectrum) scheme as it may for example be used in a CDMA (Code Division Multiple Access) communications system. Here, each symbol to be transmitted is spread by a string of pseudonoise code symbols. By applying orthogonal spreading codes, various users may be distinguished.

It is to be noted that the performance of transmitting a data signal between components of a communications system may depend on the bandwidth of the data signal. Such performance issues and beneficial effects provided by exemplary embodiments will be addressed in the description of the following figures.

Figure 3:
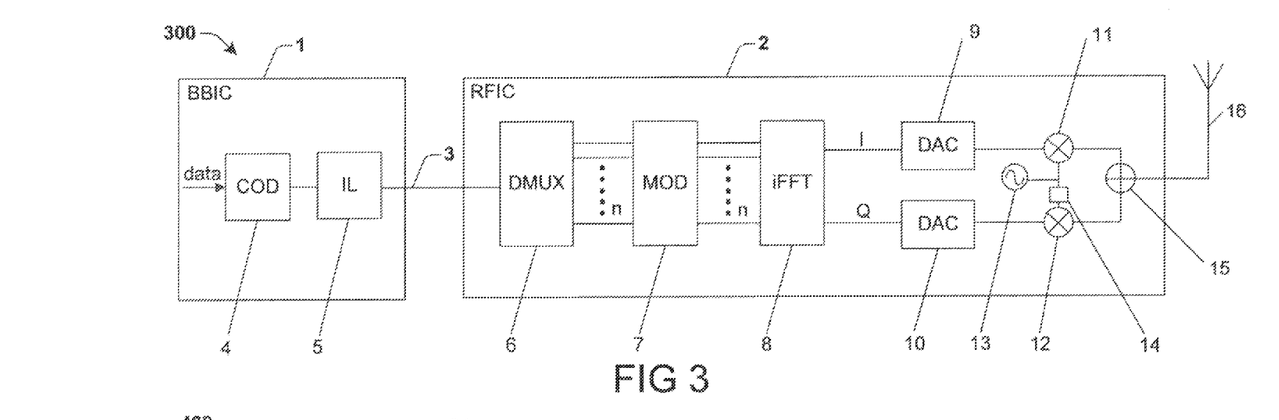
FIG. 3 schematically illustrates a transmitter 300 as an exemplary embodiment.

FIG. 3 schematically illustrates a transmitter 300 as an exemplary embodiment, wherein the transmitter 300 is configured to provide a multi-carrier modulation scheme. The illustration of the transmitter 300 is of qualitative nature. Accordingly, the transmitter 300 does not necessarily show all components required for an actual operation of a transmitter, however, such additional components are known and are appreciated by those of ordinary skill in the art.

The transmitter 300 comprises a baseband chip 1 and a radio frequency chip 2 coupled by an interface unit 3. The baseband chip 1 shows a signal path comprising a channel encoder 4 and an interleaver 5, wherein the channel encoder 4 may receive data from further (not shown) components of the baseband chip 1 (cf. arrow "data"). The radio frequency chip 3 comprises an inverse multiplexing unit 6, a modulation unit 7 and an inverse Fourier Transformation unit 8 connected in series, wherein the inverse multiplexing unit 6 is coupled to the interface unit 3. The output of the inverse Fourier Transformation unit 8 is coupled to two signal paths, with each of the signal paths comprising a Digital-Analog-Converter 9, 10 and mixers 11, 12. The mixers 11 and 12 are connected to an intermediate signal path comprising a local oscillator 13 and a phase shifter 14. The outputs of the mixers 11 and 12 are coupled to a summer 15 and an antenna 16.

In the exemplary embodiment of FIG. 3, the baseband chip 1 and the radio frequency chip 2 are implemented on physically separated substrates. However, chip technology in principle provides the possibility of implementing baseband assemblies and radio frequency assemblies on a common substrate as well. The baseband chip 1 is configured to perform a digital signal processing in the baseband, while the radio frequency chip 2 is configured to perform a digital and analog signal processing (at least partly) in the radio frequency band.

It is to be noted that communications engineering does not provide a strict standard or a strict definition for separating the baseband chip 1 and the radio frequency chip 2 concerning their design, implementation and functionality. One possibility to distinguish the baseband chip 1 from the radio frequency chip 2 may be established by implementing a standardized interface unit 3. The interface unit 3 may, for example, be based on the DigRF Dual-Mode Baseband/RF IC Interface Standard defining a physical connection between baseband assemblies and radio frequency assemblies in mobile communications systems. A DigRF interface unit thereby provides logical channels for the transmission of payload data, control data and data for the timing of components comprised in the baseband chip 1 and the radio frequency chip 2.

For the case of a data transmission performed by the transmitter 300, the channel encoder 4 receives a data stream (cf. arrow labeled "data") from a component (not shown) of the baseband chip 1 and encodes this data, for example by employing a forward error correction scheme like a convolutional encoding. The channel encoded data is passed to the interleaver 5 which performs a sort of the data employing a certain interleaving depth. The interleaver 5 forwards the interleaved data to the interface unit 3.

The interface unit 3 provides a bidirectional data exchange between the baseband chip 1 and the radio frequency chip 2 and may comprise differential pairs to preferably transmit the data in serial, digital and package oriented form. The physical implementation of the interface unit 3 is not restricted to an arrangement on only one of the chips 1 and 2, since both chips 1 and 2 may comprise an interface unit of their own. Accordingly, the actual interface unit 3 may comprise interface units on each of the chips 1 and 2, as well as the described hardware arranged between the baseband chip 1 and the radio frequency chip 2. The interface unit 3 may in particular be based on the above mentioned DigRF-Standard in one embodiment.

The data stream forwarded to the inverse multiplexing unit 6 is inversely multiplexed into n parallel data streams, wherein each of the data streams is assigned to a specific subcarrier. Here, each subcarrier holds its own frequency differing from the frequencies of all further subcarriers, preferably satisfying an orthogonality condition. The inverse multiplexing unit 6 may be embodied by a demultiplexer or a switch. In a next step, the n data streams are modulated by the modulation unit 7, wherein each of the data streams may be assigned to an individual modulation scheme. Examples for modulation schemes to be applied are the QAM (Quadrature Amplitude Modulation) scheme or the PSK (Phase Shift Keying) scheme. Generally, the modulation unit 7 is configured to apply arbitrary phase modulation schemes, arbitrary amplitude modulation schemes or combinations thereof. Due to applying different modulation schemes, each data stream may carry a different symbol rate after the modulation performed by the modulation unit 7.

In a next step, the inverse Fourier Transformation unit 8 performs an inverse Fourier Transformation on each set of symbols and outputs a multicarrier signal represented by an I(Inphase)-signal component and a Q(Quadrature)-signal component. The I- and Q-signal components are converted to analog signals by the Digital-Analog-Converters 9 and 10 arranged in the upper and lower signal path. The analog signals are then mixed (cf. mixers 11 and 12) on a carrier provided by the local oscillator 13. Here, the phase shifter provides a phase shift of 90 degrees. The two analog signals in the upper and lower signal path are summed by the summer 15, before the summed signal is finally transmitted by the antenna 16 in a radio frequency range. Note that a modulation performed by the modulation unit 7 results in an increase of the signal bandwidth as it has been described in connection with FIG. 1.

For the case of a digital data transmission between the baseband chip 1 and the radio frequency chip 2, digital samples of the baseband signal are transmitted over the interface unit 3. In one embodiment, the time resolution of the sampling is chosen in such a way that the signal can be transmitted without a loss of information comprised in the signal (besides inevitable information losses). The number of required bits for representing a digital sample depends on various criteria, like the alphabet of the employed modulation scheme or radio frequency parameters like the Error Vector Magnitude. Note that a higher resolution leads to a higher bit rate which may for example result in an increased power consumption. Moreover, there may occur scenarios in which the required bit rate does not depend on the actual data volume to be transmitted between the components of the transmitter 300.

The required resolution increases with an increase of the bandwidth of the radio frequency signal that is to be transmitted. Taking into account the change of the signal bandwidth by applying a multi-carrier modulation as it has been illustrated in FIG. 1, it becomes clear that an arrangement of the modulation unit 7 on the radio frequency chip 2 results in a decrease of the required resolution. Due to such an arrangement, the bandwidth of the transmission signal is broadened after the data has been transmitted over the interface unit 3. Accordingly, the requirements of the interface unit 3 and the power consumption of the transmitter 300 are beneficially decreased.

The arrangement of the modulation unit 7 on the radio frequency chip 2 as it is illustrated in FIG. 3 avoids a transmission of unnecessary data (added by applying the multi-carrier modulation) between the baseband chip 1 and the radio frequency chip 2. This decrease of data volume to be transmitted between the baseband chip 1 and the radio frequency chip 2 results in the described beneficial effects. In contrast to this, a transmitter having a modulation unit arranged on the baseband chip shows an increased data volume to be transmitted between the baseband chip 1 and the radio frequency chip 2, since the modulation of the data streams is performed before the data transmission.

Figure 4:
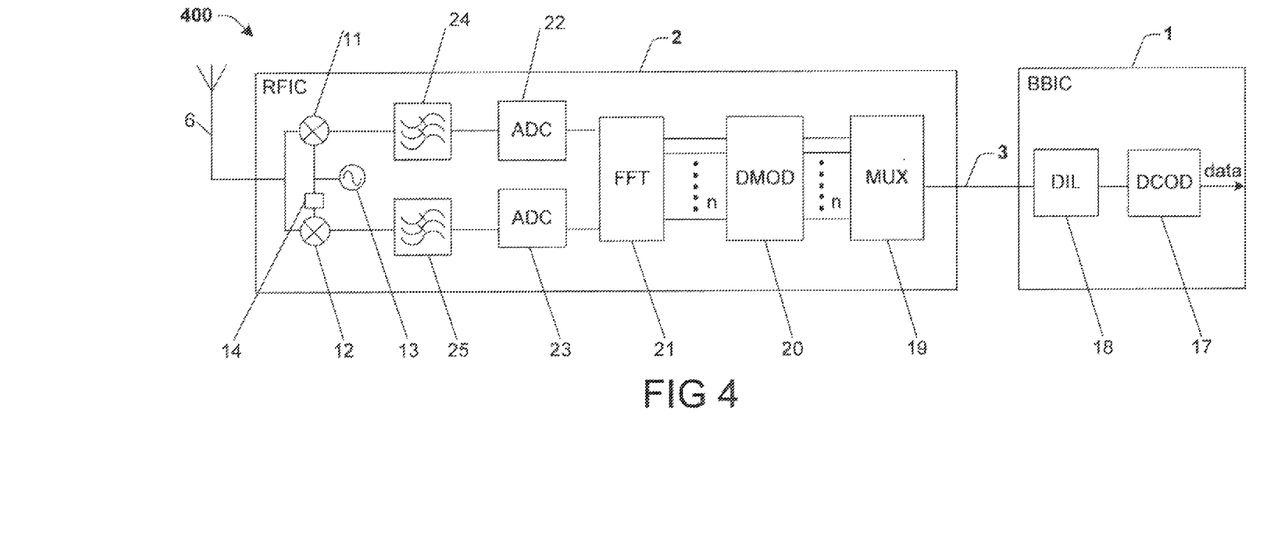
FIG. 4 schematically illustrates a receiver 400 as a further exemplary embodiment.

FIG. 4 schematically illustrates a receiver 400 as a further exemplary embodiment, wherein the receiver 400 is configured to provide a multi-carrier demodulation scheme. The illustration of the receiver 400 is of qualitative nature. Accordingly, the receiver 400 does not necessarily show all components required for an actual operation of a receiver.

The receiver 400 comprises a baseband chip 1 and a radio frequency chip 2 coupled by an interface unit 3. The baseband chip 1 shows a signal path comprising a channel decoder 17 and a deinterleaver 18, wherein the channel decoder 17 may forward data to further (not shown) components of the baseband chip 1 (cf. arrow "data"). The radio frequency chip 3 comprises a multiplexing unit 19, a demodulation unit 20 and a Fourier Transformation unit 21 connected in series, wherein the multiplexing unit 19 is coupled to the interface unit 3. The input of the Fourier Transformation unit 21 is coupled to two signal paths, with each of the signal paths comprising an Analog-Digital-Converter 22, 23, a low pass filter 24, 25 and a mixer 11, 12. The mixers 11 and 12 are connected to an intermediate signal path comprising a local oscillator 13 and a phase shifter 14 providing a phase shift of 90 degrees. The outputs of the two multipliers 11 and 12 are connected to an antenna 16.

The functionality of the receiver 400 corresponds to an inverted functionality of the transmitter 300. Note that above made comments concerning similar components comprised in the transmitter 300 are also for the receiver 400.

For the case of a data reception performed by the receiver 400, the antenna 16 receives a multicarrier signal forwarded to the mixers 11 and 12. The mixers 11 and 12 in the upper and lower signal path downconvert the radio frequency signal in a baseband or an intermediate band. Here, the local oscillator 13 and the phase shifter 14 provide cosine and sine waves at the carrier frequency. Besides the desired baseband signal, the mixers 11 and 12 further output sideband signals centered around a frequency of zero at a distance of twice the center frequency. These sideband signals are filtered by the low pass filters 24 and 25. In the upper signal path, the analog signal is then converted to a digital I-signal component by the Analog-Digital-Converter 22, while the analog signal in the lower signal path is converted to a digital Q-signal component by the Analog-Digital-Converter 23.

In a next step, the Fourier Transformation unit 21 performs a Fourier Transformation on the I-signal component and the Q-signal component, thereby generating n parallel data streams. Each of the n data streams is thought to be assigned to a subcarrier with each subcarrier holding its own frequency that differs from the frequencies of the other subcarriers. The n data streams are demodulated by the demodulation unit 20, wherein each data stream may be assigned to an individual demodulation scheme. Generally, the demodulation unit 20 is configured to demodulate multiple data streams modulated by a phase modulation scheme and/or an amplitude modulation scheme. The n data streams are multiplexed to a preferably serial data stream by the multiplexing unit 19.

The multiplexed data stream is transmitted to the baseband chip 1 for a processing by the deinterleaver 18 and the channel decoder 17. The deinterleaver 18 and the channel decoder 17 perform transformations of inverse character as they were performed by the interleaver 5 and the channel encoder 4, thereby employing, for example, a Viterbi algorithm. The data is forwarded to a further component of the baseband chip 1 (cf. arrow labeled "data").

For the case of the described data reception, the analog signals received by the receiver 400 are sampled and quantized to generate digital samples. There may occur scenarios, wherein the required sampling rate and the quantization rate does not depend on the received data volume. For example, aspects of signal theory like the Nyquist-Shannon sampling theorem determine the required data volume of the signals to be transmitted between components of the receiver 400. To avoid information loss, the sampling rate at least has to take twice the value of the nominal bandwidth of the radio frequent signal as it has been illustrated in FIG. 1.

The data volume transmitted between components of the receiver 400 is decreased after a demodulation of the digitally sampled signal, since after this demodulation merely softbits have to be transmitted. Similar to the arrangement of the transmitter 300, an arrangement of the demodulation unit 20 on the radio frequency chip 2 results in a decrease of the data volume to be transmitted between the baseband chip 1 and the radio frequency chip 2. This way, the requirements of the interface unit 3 and the power consumption are beneficially decreased. In contrast to this, a receiver comprising a demodulation unit arranged on the baseband chip shows an increased data volume to be transmitted between the baseband chip 1 and the radio frequency chip 2.

Figure 5:
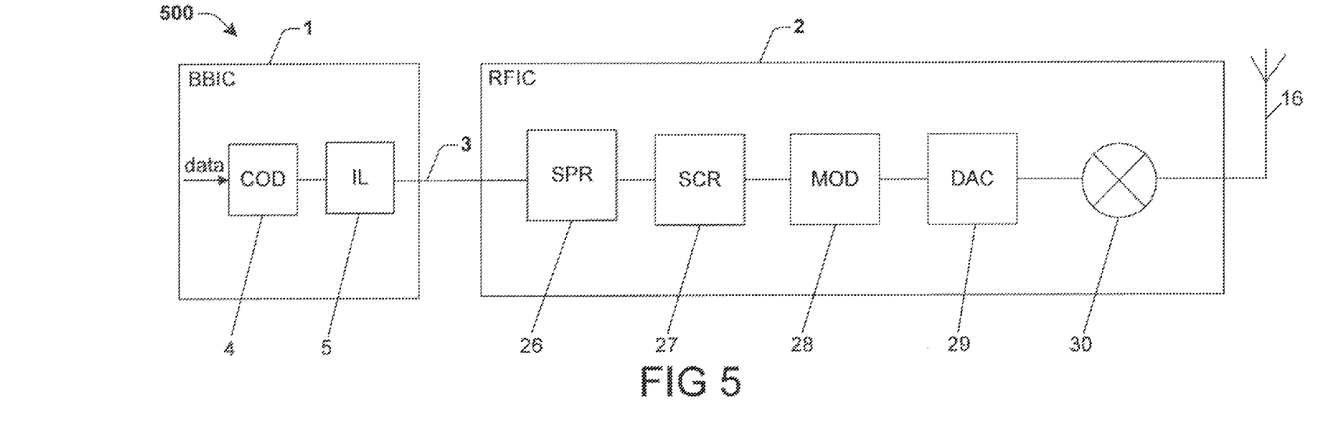
FIG. 5 schematically illustrates a transmitter 500 as a further exemplary embodiment.

FIG. 5 schematically illustrates a transmitter 500 as a further exemplary embodiment, wherein the transmitter 500 is configured to apply a spreading scheme. The illustration of the transmitter 500 is of a qualitative nature. Accordingly, the transmitter 500 does not necessarily show all components required for an actual operation of a transmitter.

The transmitter 500 comprises a baseband chip 1 and a radio frequency chip 2 coupled by an interface unit 3. The baseband chip 1 corresponds to the baseband chip 1 of the transmitter 300. The radio frequency chip 3 comprises a spreading unit 26, a scrambling unit 27, a modulation unit 28, a Digital-Analog-Converter 29 and a mixer 30 connected in series. The output of the mixer 30 is coupled to an antenna 16.

For the case of a data transmission performed by the transmitter 500, the baseband chip 1 forwards a data stream to the radio frequency chip 2. Here, the functionality of the baseband chip 1 corresponds to the functionality of the baseband chip 1 of the transmitter 300. The data stream received from the interface unit 3 is spread by the spreading unit 26 using a spreading code. For example, the data symbols of the data stream may be spread by multiplying them with a random pseudonoise code, thereby providing a possible distinction of various users. The spread signal is forwarded to the scrambling unit 27 configured to scramble the received data stream using a scrambling code, thereby providing a distinction of various cells.

In a next step, the scrambled signal is modulated by the modulation unit 28, wherein the applicable modulation schemes correspond to the modulation schemes already described in connection with the transmitter 300. Generally, the modulation unit 28 is configured to modulate a data stream using a phase modulation scheme and/or an amplitude modulation scheme. The modulated digital signal is converted to an analog signal by the Digital-Analog-Converter 29 and mixed onto a carrier by the mixer 30. The generated radio frequency signal may be transmitted by the antenna 16.

Referring to the comments on the transmitter 300 it has already been noted that the required sampling resolution increases with an increase of the bandwidth of the radio frequency signal to be transmitted. Similar to applying a multi-carrier modulation as performed by the transmitter 300, the spreading scheme as performed by the transmitter 500 leads to a broadening of the signal bandwidth (cf. FIG. 2). Accordingly, arranging the spreading unit 26 on the radio frequency chip 2 results in the same beneficial effects as they have been described in conjunction with the transmitter 300. The comments referring to these beneficial effects and made in conjunction with the transmitter 300 may be adapted accordingly.

Figure 6:
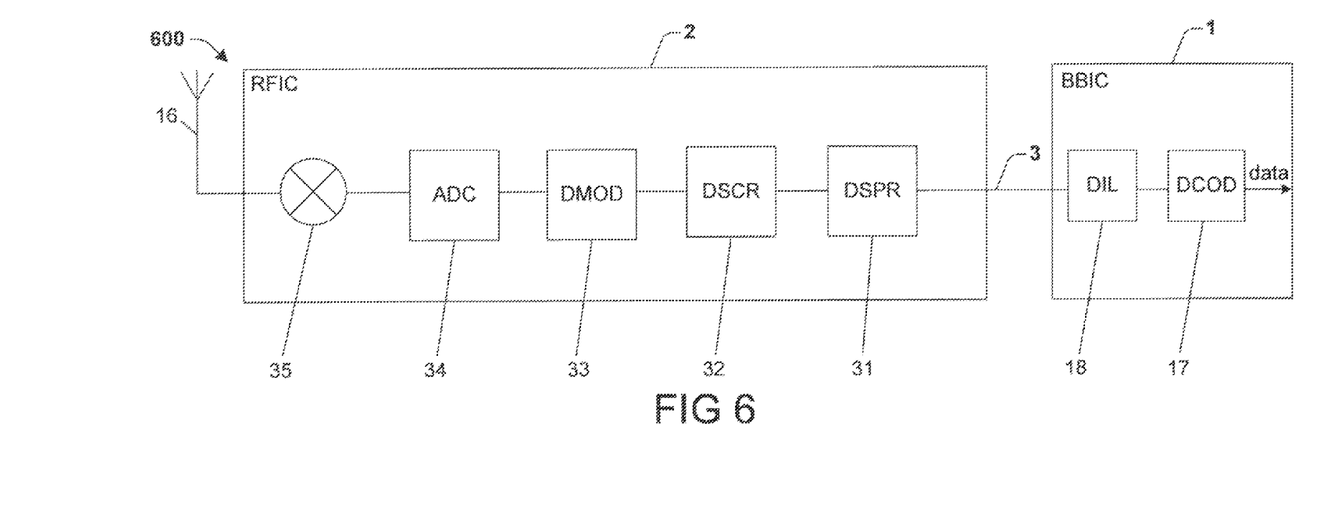
FIG. 6 schematically illustrates a receiver 600 as a further exemplary embodiment.

FIG. 6 schematically illustrates a receiver 600 as a further exemplary embodiment, wherein the receiver 600 is configured to apply a despreading scheme. The illustration of the receiver 600 is of a qualitative nature. Accordingly, the receiver 600 does not necessarily show all components required for an actual operation of a receiver.

The receiver 600 comprises a baseband chip 1 and a radio frequency chip 2 coupled by an interface unit 3. The baseband chip 1 corresponds to the baseband chip 1 of the receiver 400. The radio frequency chip 3 comprises a despreading unit 31, a descrambling unit 32, a demodulation unit 33, an Analog-Digital-Converter 34 and a mixer 35 connected in series. The input of the mixer 25 is coupled to an antenna 16.

The functionality of the receiver 600 corresponds to an inverted functionality of the transmitter 500. For the case of a data reception performed by the receiver 600, the antenna 16 receives an analog signal, which is downconverted in a baseband or an intermediate band by the mixer 35. The analog baseband signal is converted into a digital signal by the Analog-Digital-Converter 33. The downstream components 31, 32, 33 perform transformations of inverse character as performed by the components 26, 27 and 28 of the transmitter 500. Here, the despreading unit 31 may be comprised in a Rake structure. It is further to be noted that the functionality of the baseband chip 1 is similar to the functionality of the baseband chip 1 of the transmitter 400.

Similar to applying a demodulation as performed by the receiver 400, the despreading as performed by the receiver 600 results in a decrease of the data volume to be transmitted between components of the receiver 600. Accordingly, an arrangement of the despreading unit 26 on the radio frequency chip 2 results in a decreased data volume that is to be transmitted by the interface unit 3. This results in the same beneficial effects as already described in conjunction with the receiver 400, wherein the corresponding comments may be adapted accordingly.

Figure 7:
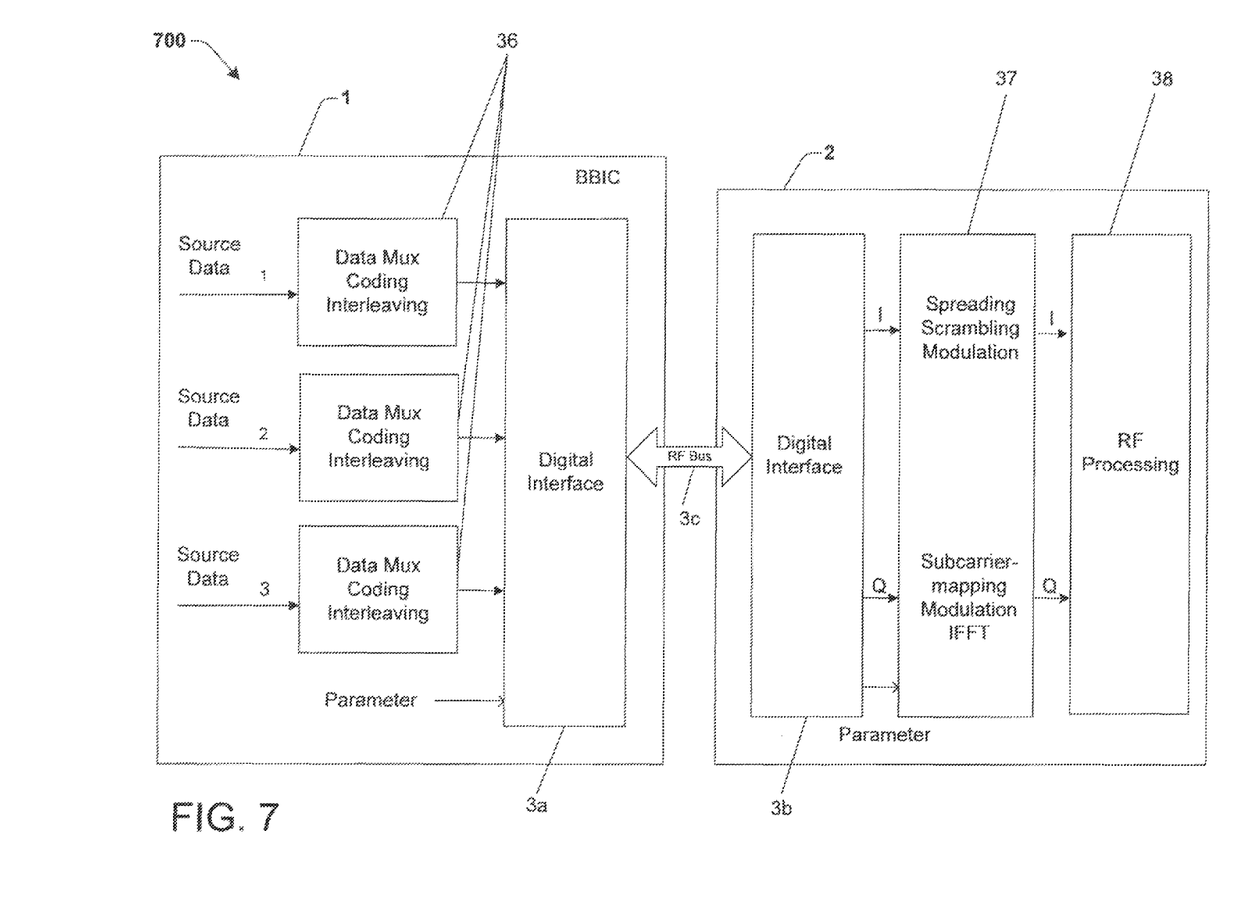
FIG. 7 schematically illustrates a transmitter 700 as a further exemplary embodiment.

FIG. 7 schematically illustrates a transmitter 700 as a further exemplary embodiment, wherein the transmitter 700 is configured to provide a multi-carrier modulation scheme and/or a spreading scheme. The illustration of the transmitter 700 is of qualitative nature. Accordingly, the transmitter 700 does not necessarily show all components required for an actual operation of a transmitter. The functionality of the transmitter 700 may be read in conjunction with the functionalities of the transmitters 300 and 500. However, compared to said transmitters, the block structure of the transmitter 700 is more top-level, thereby representing a more general embodiment.

The transmitter 700 comprises a baseband chip 1 and a radio frequency chip 1 coupled by an interface unit. The interface unit comprises interface units 3a and 3b arranged on the chips 1, 2 and a data bus 3c. The baseband chip 1 comprises units 36 configured to perform data multiplexing, data encoding and data interleaving. Each of the units 36 is arranged in a signal path and receives data from further components (not shown) of the baseband chip 1. The data processed by the units 36 is forwarded to the interface unit 3a, which further receives configuration parameters required to configure the data transmission over the data bus 3c. For example, such configuration parameters are required in case of an interface unit based on the DigRF standard. Note that the number of units 36, as well as the corresponding number of signal paths is arbitrary.

The radio frequency chip 2 comprises the interface unit 3b receiving data from the interface unit 3a over the data bus 3c. The interface unit 3b forwards an I-signal component and a Q-signal component to a unit 37 configured to perform a data processing that comprises data spreading, data scrambling and data modulation. Such a data processing corresponds to a data processing as it is performed by the transmitter 500. Alternatively, the unit 37 may be configured to perform a data processing that comprises subcarrier-mapping, data modulation and an inverse Fourier Transformation. Such a data processing corresponds to a data processing as it is performed by the transmitter 300. Note that the transmitter 700 may be configured to perform both of the described data processing schemes.

The unit 37 further receives configuration parameters determining the signal processing to be performed. The I-signal component and Q-signal output by the unit 37 are forwarded to a unit 38 to perform a further signal processing. The unit 38 may, for example, comprise filters, mixers or power control units. The processed signal may be transmitted by an antenna (not shown).

Figure 8:
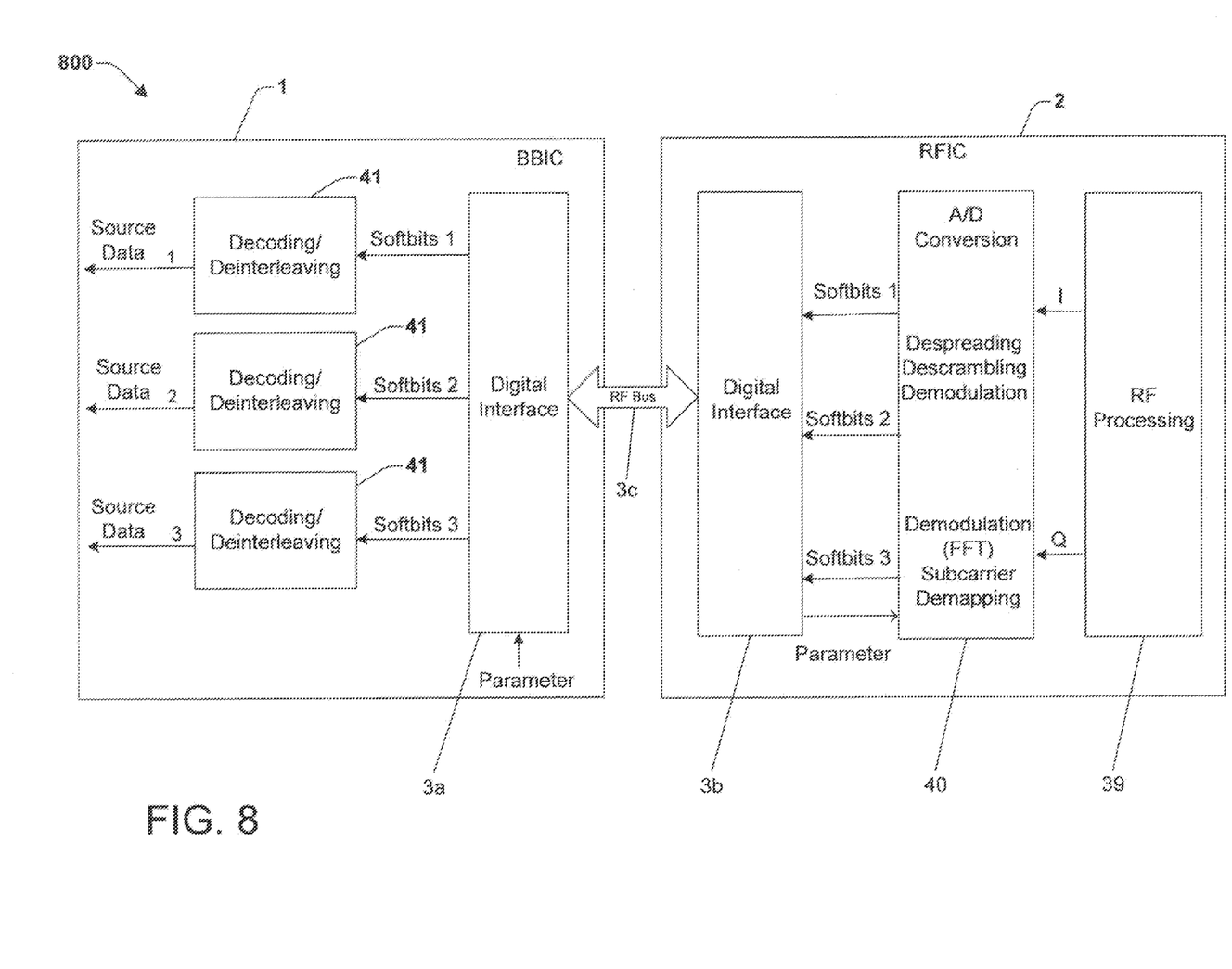
FIG. 8 schematically illustrates a receiver 800 as a further exemplary embodiment.

FIG. 8 schematically illustrates a receiver 800 as a further exemplary embodiment, wherein the receiver 800 is configured to provide a multi-carrier demodulation scheme and/or a despreading scheme. The illustration of the receiver 800 is of qualitative nature. Accordingly, the receiver 800 does not necessarily show all components required for an actual operation of a receiver. The functionality of the receiver 800 may be read in conjunction with the receivers 400 and 600. However, compared to said receivers, the block structure of the receiver 800 is more top-level, thereby representing a more general embodiment.

The receiver 800 comprises a baseband chip 1 and a radio frequency chip 1 coupled by an interface unit. The interface unit comprises interface units 3a and 3b arranged on each of the chips 1 and 2 and a data bus 3c. The radio frequency chip 2 comprises a unit 39 configured to process signals received by an antenna (not shown). The unit 39 may, for example, comprise filters, mixers or power control units and forwards an I-signal component and a Q-signal component to a unit 40 performing a conversion of the analog signal to a digital signal.

The unit 40 is further configured to perform a data processing comprising data despreading, data descrambling and data demodulation. Such a data processing corresponds to a data processing as it is performed by the receiver 600. Alternatively, the unit 40 may be configured to perform a data processing comprising data demodulation, a Fourier Transformation and subcarrier demapping. Such a data processing corresponds to a data processing performed by the receiver 400. Note that the receiver 800 may be configured to perform both of the described data processing schemes.

The unit 40 receives configuration parameters determining the signal processing to be performed. After the performed demodulation (resp. despreading), obtained softbits are transmitted to units 41, thereby passing the interface unit 3b, the data bus 3c and the interface unit 3a. Here, the interface unit 3a may further receive configuration parameters required to configure the data transmission over the data bus 3c. For example, such configuration parameters are required in case of an interface unit based on the DigRF standard. The units 41 are configured to perform a data decoding and a data deinterleaving similar to the receivers 400 and 600. Each of the units 41 is arranged in a signal path, wherein they may receive data from the interface unit 3a of the baseband chip 1 and forward processed data to further components (not shown) of the baseband chip 1. Note that the number of units 41, as well as the corresponding number of signal paths is arbitrary.

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A transmitter, comprising:
a baseband chip;
a radio frequency chip; and
an interface unit coupling the baseband chip and the radio frequency chip,
wherein the baseband chip and the radio frequency chip are separate chips,
wherein the radio frequency chip comprises a modulation unit configured to modulate multiple digital data streams, wherein each of the digital data streams is assigned to a subcarrier having a frequency differing from the frequencies of the other subcarriers, and
wherein the baseband chip comprises a channel encoder, an interleaver, or both.

2. The transmitter of claim 1, wherein the modulation unit is configured to modulate data using a phase modulation scheme, amplitude modulation scheme, or both.

3. The transmitter of claim 1, wherein the radio frequency chip comprises an inverse Fourier Transformation unit configured to perform an inverse Fourier Transformation of the modulated data streams.

4. The transmitter of claim 3, wherein the inverse Fourier Transformation unit outputs a multicarrier signal.

5. The transmitter of claim 1, wherein the radio frequency chip comprises an inverse multiplexing unit configured to receive data from the interface unit and inversely multiplex the data into the multiple data streams.

6. The transmitter of claim 1, wherein the interface unit is digital.

7. A receiver, comprising:
a baseband chip;
a radio frequency chip; and
an interface unit coupling the baseband chip and the radio frequency chip,
wherein the baseband chip and the radio frequency chip are separate chips,
wherein the radio frequency chip comprises a demodulation unit configured to demodulate multiple digital data streams, wherein each of the digital data streams is assigned to a subcarrier having a frequency differing from the frequencies of the other subcarriers, and
wherein the baseband chip comprises a channel decoder, a deinterleaver, or both.

8. The receiver of claim 7, wherein the demodulation unit is configured to demodulate data using a phase demodulation scheme, an amplitude demodulation scheme, or both.

9. The receiver of claim 7, wherein the radio frequency chip comprises an Fourier Transformation unit configured to perform a Fourier Transformation of a received multicarrier signal.

10. The receiver of claim 9, wherein the Fourier Transformation unit outputs the multiple data streams.

11. The receiver of claim 7, wherein the radio frequency chip comprises a multiplexing unit configured to multiplex data streams received from the demodulation unit into a data stream transmitted to the interface unit.

12. The receiver of claim 7, wherein the interface unit is digital.

13. A transmitter, comprising:
a baseband chip;
a radio frequency chip; and
an interface unit coupling the baseband chip and the radio frequency chip,
wherein the baseband chip and the radio frequency chip are separate chips, and
wherein the radio frequency chip comprises a spreading unit configured to spread a data stream using a spreading code, and
wherein the baseband chip comprises a channel encoder, an interleaver, or both.

14. The transmitter of claim 13, wherein the radio frequency chip comprises a scrambling unit configured to scramble a data stream using a scrambling code.

15. The transmitter of claim 13, wherein the radio frequency chip comprises a modulation unit configured to modulate a data stream using a phase modulation scheme, an amplitude modulation scheme, or both.

16. The transmitter of claim 13, wherein the interface unit is digital.

17. A receiver, comprising:
a baseband chip;
a radio frequency chip; and
an interface unit coupling the baseband chip and the radio frequency chip,
wherein the baseband chip and the radio frequency chip are separate chips,
wherein the radio frequency chip comprises a despreading unit configured to despread a data stream using a despreading code, and
wherein the baseband chip comprises a channel decoder, a deinterleaver, or both.

18. The receiver of claim 17, wherein the despreading unit is comprised in a Rake structure.

19. The receiver of claim 17, wherein the radio frequency chip comprises a descrambling unit configured to descramble a data stream using a descrambling code.

20. The receiver of claim 17, wherein the radio frequency chip comprises a demodulation unit configured to demodulate a data stream using a phase demodulation scheme, an amplitude demodulation scheme, or both.

21. The receiver of claim 17, wherein the interface unit is digital.

22. The transmitter of claim 1, wherein the baseband chip and the radio frequency chip are implemented on physically separate substrates.

23. The transmitter of claim 1, wherein the interface unit is configured to provide a logical channel for a transmission of at least one of payload data, control data and data for a timing of components comprised in at least one of the baseband chip and the radio frequency chip.

24. The transmitter of claim 1, wherein the interface unit comprises differential pairs.

25. The transmitter of claim 1, wherein the interface unit is configured to transmit data in a serial, digital or package oriented form.

* * * * *